United States Patent [19]

Stay et al.

[11] Patent Number: 4,895,415

[45] Date of Patent: Jan. 23, 1990

[54] VEHICLE WHEEL COVER AND ASSEMBLY

[75] Inventors: Randall W. Stay, Redford; Gerald F. Herbert, Bloomfield Hills, both of Mich.

[73] Assignee: Ford Motor Company, Dearborn, Mich.

[21] Appl. No.: 118,077

[22] Filed: Nov. 9, 1987

[51] Int. Cl.⁴ ............................................. B60B 7/06
[52] U.S. Cl. ................................. 301/37 S; 301/37 P; 301/108 A
[58] Field of Search .................. 301/37 R, 37 P, 37 S, 301/37 SC, 108 R, 108 A, 108 S, 108 SC; 411/185, 186, 187, 188, 301, 907, 908, 332, 6, 7, 14, 429, 402, 410; 403/380, 97

[56] References Cited

U.S. PATENT DOCUMENTS

| | | | |
|---|---|---|---|
| 288,923 | 11/1883 | Cole | 411/402 |
| 1,585,401 | 5/1926 | Main | 301/108 S |
| 2,826,231 | 3/1958 | Alden | 411/410 X |
| 3,078,899 | 2/1963 | MacLean, III et al. | 411/185 |
| 3,202,460 | 8/1965 | Holbrow | 301/37 R |
| 3,356,421 | 12/1967 | Trevarrow | 301/37 R |
| 3,549,204 | 12/1970 | Spisak | 301/37 R |
| 3,554,536 | 1/1971 | Richter | 301/108 S |
| 3,791,700 | 2/1974 | Golze | 301/37 CM |
| 3,876,257 | 4/1975 | Buerger | 301/37 P |
| 4,114,952 | 9/1978 | Kimmel | 301/37 SC |
| 4,133,583 | 1/1979 | Spisak | 301/37 TP |
| 4,268,090 | 5/1981 | Rush | 301/5 BA |
| 4,290,469 | 9/1981 | Nakae | 411/185 |
| 4,513,172 | 4/1985 | Matsui | 411/14 X |
| 4,632,465 | 12/1986 | Cummings | 301/108 S |
| 4,715,756 | 12/1987 | Danico et al. | 411/908 X |

FOREIGN PATENT DOCUMENTS 633632 10/1927 France ............................ 301/108 S

*Primary Examiner*—Russell D. Stormer
*Attorney, Agent, or Firm*—Peter D. McDermott; Roger L. May

[57] ABSTRACT

A vehicle wheel cover assembly is provided comprising a vehicle wheel mounted on a plurality of circumferentially spaced lug studs with lug stud nuts. A wheel cover overlaying the vehicle wheel is formed with a plurality of circumferentially spaced openings through each of which spaced openings extends the end of a corresponding lug studs. Wheel cover retainer nuts engage the lug studs to secure the wheel cover to the wheel.

9 Claims, 1 Drawing Sheet

VEHICLE WHEEL COVER AND ASSEMBLY

BACKGROUND OF THE INVENTION

This invention relates to wheel covers for motor vehicle road wheels and to an assembly comprising secondary lug stud nuts for attaching such covers to the wheels.

Numerous retention means and systems are known to the skilled of the art for retaining a wheel cover to a motor vehicle wheel. It frequently is desirable to provide a wheel cover with a retention system which does not rely on any particular contour of the wheel's surface to retain the wheel cover in position. Wheel cover retention systems which rely on a frictional engagement with a radially inward facing annular surface of the rim portion of a wheel or the lip flange of such rim portion are known. Such retention means, generally located at the outer periphery of the wheel cover, do not positively lock the wheel cover to the wheel and, in addition, typically prevent rotation of the wheel cover outer periphery relative to the vehicle wheel. Also, such peripheral retention means involve considerable manufacturing complexity and cost, typically requiring the use of metal bands, metal retention clips, etc. Also, the wheel cover must be of adequate weight and structure to afford a durability requisite to withstand the forces applied to the wheel cover to engage it with the vehicle wheel.

Other wheel cover retention systems are known which relay on the lug stud nuts which retain the wheel to the vehicle axle. Such systems, however, generallly require the use of a non-standard lug stud nut adapted to facilitate engagement with the wheel cover. This involves both a cost and complexity penalty for such retention systems. In addition, retention means of this type typically are disadvantageous in that the vehicle wheel must be mounted onto the lug studs and held in position without benefit of the lug stud nuts, while the much more fragile wheel cover is mounted over the wheel onto the lug studs. Not only is this frequently a difficult operation to coordinate, but it presents risk of damage to the fragile wheel cover while the lug stud nuts are assembled, since during this time the heavy wheel is held in position by applying considerable pressure against the outer surface of the wheel cover overlaying the wheel.

It is an object of the present invention to provide a wheel cover and a wheel cover assembly employing a retention means which does not require engagement with the vehicle wheel at the outer periphery of the wheel cover and which does not require non-standard lug studs or lug stud nuts to mount the wheel. It is a further object of this invention to provide a retention means whereby such wheel cover can be mounted separately and independently to the vehicle wheel following mounting of the wheel. Additional objects and advantages of the invention will be understood from the following description.

SUMMARY OF THE INVENTION

According to the present invention a wheel cover is provided for a vehicle wheel having a spider portion forming a central mounting portion defining a central hub receiving opening and a plurality of circumferentially spaced lug stud receiving openings arranged radially outwardly from the central opening. The wheel cover has a radially extending outside surface (i.e., an axially outward facing surface in a plane substantially normal to the vehicle wheel axis) and comprises a plurality of circumferentially spaced openings adapted to receive lug studs extending through the lug stud receiving openings of the wheel. A radially extending portion of the outside surface immediately peripheral to each such spaced opening is serrated.

According to a second aspect of the invention, a vehicle wheel assembly is provided comprising a wheel having a rim portion and a spider portion, the spider portion forming a central mounting portion and a peripheral rim engaging portion, the central mounting portion defining a central hub receiving opening and a plurality of circumferentially spaced lug stud receiving openings arranged radially outwardly from such central opening;

a plurality of lug studs extending, one each, through a corresponding one of such lug stud receiving openings of the wheel;

a plurality of lug stud nuts engaging, one each, a corresponding one of such lug stud receiving openings of the wheel;

a plurality of lug stud nuts engaging, one each, a corresponding one of the lug studs for operatively securing the wheel to the vehicle;

a wheel cover overlaying at least a central area of the spider portion, being formed with a plurality of circumferentially spaced openings, each of which is aligned with one of the lug stud receiving openings of the spider portion and through each of which spaced openings extends an end portion of a corresponding one of a plurality of the lug studs (i.e. an end portion of the lug stud extending beyond its corresponding lug stud nut); and a plurality of wheel cover retainer nuts engaging, one each, a corresponding lug stud end portion for operatively securing the wheel cover to the wheel. The outside surface of the wheel cover of such assembly preferably is serrated immediaetely peripheral to each of the spaced openings, i.e., in the areas of contact with the wheel cover retainer nuts. In this case the surface of the wheel cover retainer nuts in contact with such serrated surface areas of the wheel cover also are serrated. In this way the wheel cover retainer nuts form a more positive engagement and can be heard and felt to reach a suitably tight engagement with the lug studs and wheel cover. These and additional advantages and features of the invention will be more apparent from consideration of the following description taken in connection with the accompanying drawings.

DETAILED DESCRIPTION OF PREFERRED EMBODIMENTS

Figure 1:
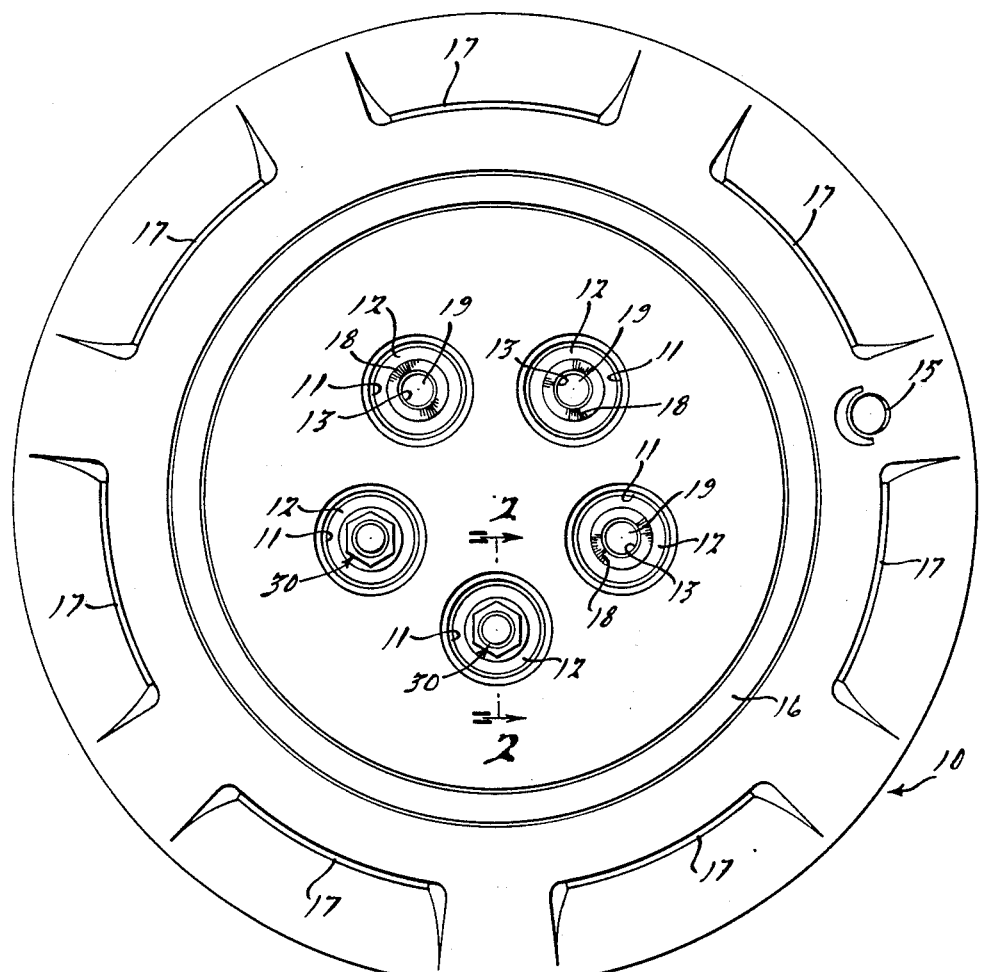
FIG. 1 is a plan view (partially broken away) of a wheel cover assembly according to the present invention.

Referring now in detail to the drawings, a wheel cover assembly according to the invention is seen to comprise a wheel cover 10, a plurality of lug stud nuts 20 (one being shown in FIG. 2) and a plurality of wheel cover retainer nuts 30. In the preferred embodiment shown, wheel cover 10 is formed of a molded plastic material, although in view of the present disclosure it will be appreciated by the skilled of the art that numerous alternative materials and wheel cover shapes and designs are suitable for use in the present invention. Wheel cover 10 is seen to be formed with axially inward extending wells 11, each having a well bottom wall 12. Wheel cover 10 further comprises circumferentially spaced openings 13 therethrough, such spaced openings being located, one each, in a corresponding well bottom wall. The circumferentially spaced openings 13 in the wheel cover 10 are located to correspond in position to the lug studs by which the vehile wheel is fixed to the axial hub. It should be noted that in FIG. 1 the lowermost and lower left wells 11 are shown with retainer nuts 30 in position. The two upper wells and the right side well are shown without retainer nuts for purposes of illustration. Thus, in each of the three last mentioned wells the outboard end surface 19 of the corresponding lug studs 60 can be seen.

Also seen in the wheel cover of FIG. 1 is valve stem opening 15, decorative annular strip 16 on the axially outer surface of the wheel cover, and molded-in openings 17 at the radial periphery of the wheel cover. As further discussed below, the wheel cover is retained to the vehicle wheel by means of retention nuts 30 Accordingly, it will be appreciated in view of the present disclosure that, if the radially outer portion of the wheel cover, e.g. that portion radially outside decorative strip 16, was rotatable relative the inner portion, this would facilitate easy mounting of the wheel cover to the vehicle wheel. This is because the central portion of the wheel cover could be aligned with and partially mounted to the lug studs, while the outer peripheral portion was rotated to align the value stem opening 15 with the valve stem of the wheel. This advantage derives from the fact that the retention means of the present invention does not rely on engagement with the rim portion of the vehicle wheel.

Figure 2:
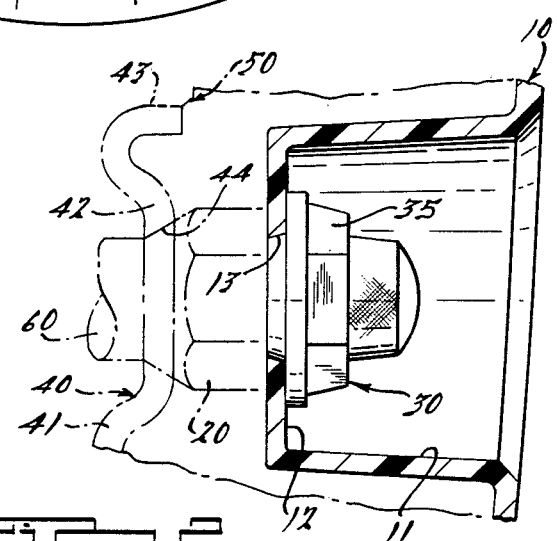
FIG. 2 is a section view (broken away) taken through line 2—2 of FIG. 1.

Referring now particularly to FIG. 2, wheel cover 10 is seen to be mounted to vehicle wheel 40 of routine vehicle wheel design well known to those skilled in the art. Thus, wheel 40 provides spider portion 41 having a central mounting portion 42 and a peripheral rim engaging portion (not shown) at the interface of the spider portion and the rim portion. The mouting portion 42 defines a central hub receiving opening 43 (a small portion of vehicle axle hub 50 is shown) and a plurality of circumferentially spaced lug stud receiving openings 44 (of which one is seen in FIG. 2) arranged radially outwardly from the central opening 43. A plurality of lug studs 60 (of which one is seen in FIG. 2) extend, one each, through a corresponding one of the lug stud receiving openings 44 of the vehicle wheel. A plurality of lug stud nuts 20 (of which one is seen in FIG. 2) engage, one each, a corresponding one of the lug studs for operatively securing the wheel to the vehicle. Thus, the vehicle wheel can be mounted to the vehicle without involvement of the wheel cover. Subsequent to mounting the wheel, the wheel cover is placed over the wheel, such that lug studs 60 register, one each, with the corresponding circumferentially spaced opening in the wheel cover. In the preferred embodiment of the invention shown in the drawings, as best seen in FIG. 2, the axially inside surface of the wheel cover contacts teh axially outside surface of lug stud nuts 20 and, in fact, is sandwiched between lug stud nuts 20 and wheel cover retention nuts 30. Obviously, end surface 19 of each lug stud nut 60 must extend axially outward through the corresponding circumferentially spaced opening 13 of the wheel cover to be engaged by the retention nuts 30.

Figure 3:
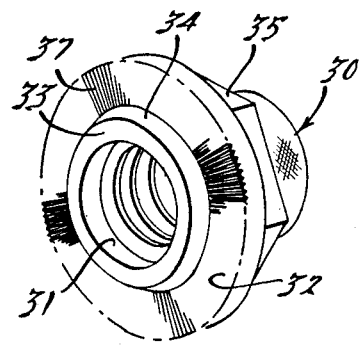
FIG. 3 is a perspective view of a secondary lug stud nut of the assembly of FIG. 1.

Referring now particularly to FIG. 3, wheel cover retention nut 30 according to a preferred embodiment of the invention will now be described in greater detail. Retention nut 30 can be formed of metal, plastic, etc., preferably plastic and provides threaded bore 31 to receive the lug stud 60. Surface 32 seats against the axially outside surface of the wheel cover 10, i.e., in the specific embodiment shown, against well bottom wall 12. According to the preferred embodiment shown in the drawings, surface 32 is serrated, that is, it has radially extending ridges or teeth. A corresponding surface area of the wheel cover, that is, a radially extending portion of the outboard surface of the wheel cover immediately perpheral to each of the spaced openings thereof, is correspondingly serrated. Thus, as the retainer nut is tightened onto the lug stud, the serrations of the retainer nut contact those of the wheel cover. With a slight further degree of tightening, the two opposed sets of serrations nest within each other and serve to resist loosening of the retainer nut. Also, as the two sets of serrations pass over one another during tightening of the retention nut, an audible and tactile signal is generated to aid in achieving an appropriate degree of tightness. In FIG. 3 serrations 37 can be seen in surface 32. The serrations preferably cover the entire surface 32. The corresponding serrations 18 in the surface of the wheel cover can be seen in FIG. 1.

The retention nut according to the preferred embodiment shown in the drawings further comprises a frustoconical extension 34 extending axially inward from the serrated surface into the corresponding circumferentially spaced opening of the wheel cover. The term "frusto-conical" is used in this regard to denote an extension which is of smaller diameter at its axially inward end 33 than it is at the serrated surface 32. As seen in FIG. 2, this extension nests with an opening 13 in the wheel cover. Its frusto-conical shape facilitates proper positioning of the retention nut as it is screwed onto the lug stud.

Retention nut 30 is closed-ended at its axially outer end for aesthetic reasons and also to minimize the migration of moisture and dirt into the threaded engagement with the lug stud. Preferably the exterior surface of the retention nut is at least partially knurled since, typically, it will be hand-tightened onto the lug stud. It may be desirable, however, to employ a lug wrench to loosen and remove the retention nut, particularly after long periods of undisturbed engagement with the lug stud. For this purpose, the retention nut according to the preferred embodiment shown in the drawings comprises an at least partially polyhedral exterior surface 35 having a longitudinal axis substantially parallel to that of the wheel. Typically, this will be a hexagonal surface to match the configuration of the lug stud nut, whereby a common lug wrench can be used for both the retention nut and the lug stud nut. According to a most preferred embodiment, wherein the retention nut is formed of plastic, the polyhedral surface extends less than about one-third the axial height of the nut and is slightly frusto-conical, being of smaller diameter at the axially outer end. The limited axial height of the polyhedral portion of the surface and the slightly frusto-conical shape thereof help to prevent damage to the retainer nut from application of excessive force through the lug wrench. This would apply both in tightening and in loosening the retention nut on the lug stud. The limited height and frusto-conical shape would cause the lug wrench to be prone to slip off the retainer nut as excessive torque began to be applied.

All components of the vehicle wheel assembly of the present invention can be produced according to manufacturing methods well known to the skilled of the art. Thus, it will be well within the skill of the art in view of the present disclosure to manufacture plastic and metal retention nuts according to the invention. Similarly, wheel covers of various materials and numerous known designs will be readily adaptable to the present invention.

While it will be apparent that the preferred embodiment illustrated herein is well calculated to fulfill the objects above-stated, it will be appreciated that various modifications and changes may be made thereto without departing from the true scope of the invention as defined in the following claims.

We claim:

1. A vehicle wheel assembly comprising:
   a wheel having a rim portion and a spider portion, said spider portion having a central mounting portion and a peripheral rim engaging portion, said mounting portion defining a central hub receiving opening and a plurality of circumferentially spaced lug stud receiving openings arranged radially outwardly from said central opening;
   a plurality of lug studs extending, one each, through a corresponding one of said lug stud receiving openings of said wheel;
   a plurality of lug stud nuts engaging, one each, a corresponding one of said lug studs for operatively securing said wheel to the vehicle;
   a wheel cover overlaying at least a central area of said spider portion, being formed with a plurality of circumferentially spaced openings, each of which is aligned with one of said lug stud receiving openings of said spider portion and through each of which spaced openings extends an end portion of a corresponding one of a plurality of said lug studs extending beyond its corresponding lug stud nut; and
   a plurality of wheel cover retainer nuts engaging, one each, a corresponding lug stud end portion, operatively securing said wheel cover to the wheel, each of said retainer nuts having (i) a polyhedral exterior surface portion with a longitudinal axis substantially parallel to that of the wheel, which polyhedral exterior surface portion is frusto-conical to limit lug wrench torque applicable thereto, and (ii) a knurled exterior surface portion outward of said polyhedral exterior surface portion.

2. The vehicle wheel assembly according to claim 1, wherein each of said retainer nuts comprises a frusto-conical extension extending axially inward into a corresponding one of said circumferentially spaced openings of said wheel cover, said extension being of smaller diameter at its axially inward end.

3. The vehicle wheel assembly according to claim 2, wherein each said frusto-conical extension is substnatially in contact with an axially extending annular surface of a corresponding one of said circumferentially spaced openings of said wheel cover.

4. The vehicle wheel assembly according to claim 1, wherein the polyhedral portion of the exterior surface of each of said retainer nuts is less than about one-third the axial height thereof.

5. The vehicle wheel assembly according to claim 1, wherein said retainer nuts are plastic.

6. The vehicle wheel assembly according to claim 1, wherein each of said retainer nuts is closed-ended at its axially outer end.

7. The vehicle wheel assembly according to claim 1, wherein a radially extending, axially outward facing surface of each of said lug stud nuts has substantial surface contact with a corresponding, radially extending, axially inward facing surface portion of said wheel cover, said wheel cover being sandwiched between said lug stud nuts inside and said retainer nuts outside.

8. The vehicle wheel assembly according to claim 1, wherein said wheel cover is formed with axially inward extending wells, each having a well bottom wall, said spaced openings, one each, located in a corresponding well bottom wall, said retainer nuts being disposed, one each, within a corresponding one of said wells.

9. A vehicle wheel assembly comprising:
   a wheel having a rim portion and a spider portion, said spider portion having a central mounting portion and a peripheral rim engaging portion, said mounting portion defining a central hub receiving opening and a plurality of circumferentially spaced lug stud receiving openings arranged radially outwardly from said central opening;
   a plurality of lug studs extending, one each, through a corresponding one of said lug stud receiving openings of said wheel;
   a plurality of lug stud nuts engaging, one each, a corresponding one of said lug studs for operatively securing said wheel to the vehicle;
   a wheel cover overlaying at least a central area of said spider portion, being formed with axially inward extending wells, each having a well bottom wall, and with a plurality of circumferentially spaced openings located, one each, in a corresponding well bottom wall, each of said spaced openings being aligned with one of said lug stud receiving openings of said spider portion, an end portion of a corresponding one of said lug studs extending beyond its corresponding lug stud nut through a corresponding one of said spaced openings, wherein a radially extending portion of the outboard surface of the wheel cover immediately peripheral to each of the said spaced openings is serrated; and
   a plurality of plastic wheel cover retainer nuts, each being disposed within a corresponding one of said wells and engaging, one each, a corresponding lug stud end portion for operatively securing said wheel cover to the wheel, each said retainer nut being closed-ended at its axially outer end and having:
   (i) a frusto-conical extension extending axially inward into a corresponding one of said circumferentially spaced openings of said wheel cover, said extension being of smaller diameter at is axially inward end and being substantially in contact with an axially extending annular surface of said corresponding one of said circumferentially spaced openings of said wheel cover;
   (ii) a portion of its exterior surface formed as a frusto-conical polyhedron to limit lug wrench torque applicable thereto with a longitudinal axis substantially parallel to that of the wheel, wherein a radially extending, axially outward facing surface of each of said lug stud nuts has substantial surface contact with a corresponding, radially extending, axially inward facing surface portion of said wheel cover, said wheel cover being sandwiched between said lug stud nuts and said retainer nuts; and (iii) a radially extending, axially inward facing serrated surface engaging a corresponding serrated portion of said outboard surface of the wheel cover.

* * * * *